(12) United States Patent
Karchevsky (10) Patent No.: US 12,194,544 B2
(45) Date of Patent: Jan. 14, 2025

(54) ATTACHMENT APPARATUS FOR LASER ENGRAVING

(71) Applicant: LensDigital, LLC, Old Bridge, NJ (US)

(72) Inventor: Leonid Karchevsky, South River, NJ (US)

(73) Assignee: LensDigital, LLC, Old Bridge, NJ (US)

( * ) Notice: Subject to any disclaimer, the term of this patent is extended or adjusted under 35 U.S.C. 154(b) by 0 days.

(21) Appl. No.: 18/412,400

(22) Filed: Jan. 12, 2024

(65) Prior Publication Data
US 2024/0238877 A1     Jul. 18, 2024

Related U.S. Application Data

(60) Provisional application No. 63/533,349, filed on Aug. 17, 2023, provisional application No. 63/438,767, filed on Jan. 12, 2023.

(51) Int. Cl.
| | |
|---|---|
| *B23B 31/163* | (2006.01) |
| *B23B 31/16* | (2006.01) |
| *B44B 7/00* | (2006.01) |

(52) U.S. Cl.
CPC .. *B23B 31/16041* (2013.01); *B23B 31/16008* (2013.01); *B44B 7/00* (2013.01); *B23B 31/1627* (2013.01)

(58) Field of Classification Search
CPC ........ B23B 31/16004; B23B 31/16008; B23B 31/16012; B23B 31/16041; B44B 7/00; Y10T 279/1926; Y10T 279/1933; Y10T 279/1941
See application file for complete search history.

(56) References Cited

U.S. PATENT DOCUMENTS

| | | | | |
|---|---|---|---|---|
| 687,533 | A | * | 11/1901 | Kitchin ............. B23B 31/16004 82/164 |
| 1,046,523 | A | * | 12/1912 | Whiton ............. B23B 31/16004 279/116 |
| 2,511,930 | A | * | 6/1950 | Martens ................. B23Q 1/763 279/116 |
| 2,904,339 | A | * | 9/1959 | Swanson ........... B23B 31/16012 464/36 |
| 2,905,476 | A | * | 9/1959 | Brainerd ........... B23B 31/16008 464/38 |
| 3,049,737 | A | * | 8/1962 | Weibel ...................... B23G 1/22 81/186 |
| D985,640 | S | * | 5/2023 | Rife ............................. D15/199 |

(Continued)

FOREIGN PATENT DOCUMENTS

| | | | | | |
|---|---|---|---|---|---|
| CN | 103612012 | A | * | 3/2014 | ......... B23K 26/0823 |
| CN | 110253159 | A | * | 9/2019 | ......... B23K 26/0876 |

(Continued)

*Primary Examiner* — Eric A. Gates
(74) *Attorney, Agent, or Firm* — Bochner PLLC; Andrew D Bochner; Eric R Kleinertz (57) ABSTRACT

An attachment apparatus for laser engraving comprising a chuck housing comprising a plurality of channels; a plurality of self-centering jaws bases disposed within the plurality of channels, the plurality of self-centering jaws bases further comprising at least one jaws base hole; and a scroll wheel in mechanical communication with the plurality of self-centering jaws bases.

19 Claims, 10 Drawing Sheets

(56) References Cited

U.S. PATENT DOCUMENTS

| | | | | |
|---|---|---|---|---|
| D1,013,005 S | * | 1/2024 | Karchevsky | D15/138 |
| D1,013,006 S | * | 1/2024 | Karchevsky | D15/138 |
| D1,028,040 S | * | 5/2024 | Karchevsky | D15/140 |
| 2023/0405714 A1 | * | 12/2023 | Rife | B23K 26/0823 |

FOREIGN PATENT DOCUMENTS

| | | | | | |
|---|---|---|---|---|---|
| CN | 112222641 | A | * | 1/2021 | B23K 26/0823 |
| CN | 112570910 | A | * | 3/2021 | B23K 26/38 |
| CN | 112846545 | A | * | 5/2021 | B23K 26/0823 |
| CN | 114211119 | A | * | 3/2022 | |
| CN | 113351901 | B | * | 6/2022 | |
| FR | 2649345 | A1 | * | 1/1991 | |
| KR | 102196697 | B1 | * | 12/2020 | |
| WO | WO-2020064115 | A1 | * | 4/2020 | B23B 31/16012 |

\* cited by examiner

ATTACHMENT APPARATUS FOR LASER ENGRAVING

CROSS-REFERENCE TO RELATED APPLICATIONS

This application claims priority to U.S. Provisional Patent Application No. 63/438,767, filed Jan. 12, 2023, and to U.S. Provisional Patent Application No. 63/533,349 filed Aug. 17, 2023, the entire contents of which are incorporated herein by reference in their entirety.

FIELD OF THE INVENTION

The present disclosure is directed to an attachment apparatus within the field of laser engraving. Specifically, the present disclosure is directed to a rotary attachment apparatus for simultaneously holding and rotating objects during a laser engraving process.

INTRODUCTION

Light Amplification by Stimulated Emission of Radiation, colloquially referred to as a "laser," is an artificially created beam of light. The beam of light emitted from a laser is comprised of a plurality of individual light waves, wherein the individual waves travel through space in synchronicity. Meaning, the individual waves of light travel in phase. Lasers, first created in 1960, were originally used for the purpose of furthering scientific understanding of atomic physics and chemistry. However, over time lasers made their way into manufacturing processes across a multitude of industries, and today are utilized for everything from cat toys to surgical procedures.

One use of lasers today is for engraving various tangible articles. Consequently, rotary attachments were developed for simultaneously clasping and rotating said articles allowing a laser engraver to engrave text and/or graphics on the articles. Traditionally, there are two variations of a rotary attachment: (1) a roller-style attachment; and (2) a chuck-style attachment. The roller-style attachments utilize a set of rollers, facilitating rotation of an article, when placed upon said rollers, by employing the force of friction. The chuck-style attachments promote rotational movement of an article by securing said article in a set of jaws capable of rotating.

One benefit of chuck-style rotary attachments is the jaws may alleviate the issue of articles slipping off the attachment rotary, which is a common impediment when using roller-style rotary attachments. However, contemporary chuck-style rotary attachments are overly cumbersome and are adapted for work involving heavy metal parts; meaning, said attachments are poorly suited for holding delicate articles such as, glassware, that can be easily broken or deformed by the metal jaws employed by chuck-style rotary attachments. Additionally, traditional chuck-style rotary attachments in most cases do not have tilting capabilities which limit the use of tapered objects because, in some cases, the inability to tilt an article's surface hinders the laser engraver from effectively engraving said article. Further, traditional chuck-style rotaries are limited in the dimensions of articles they can accommodate, which results from both the chuck height and the reach of the jaws. Additionally, traditional jaws are designed to clamp articles on an outside surface of said article. However, in many circumstances, it is preferred to clamp the article on an inside surface, which in turn ensures that both a maximum amount of the article's surface area is available for engraving and that the head of the laser engraver does not collide with the jaws. Unfortunately, when clamping an article from an inside surface, difficulties such as ensuring that the article's central axis is parallel to the chuck-style rotary's central axis arise, which, traditionally, requires an additional alignment tool to correct.

Accordingly, it would be desirable to provide a chuck-style rotary attachment for laser engraving configured to clamp delicate articles. Further, it would be desirable to provide a chuck-style rotary attachment capable of effectively clamping an article from an inside surface of said article. It would be yet further desirable to provide a chuck-style rotary attachment that obviates the need for additional tooling to properly align an article's central axis, with the central axis of said rotary.

SUMMARY

This Summary is provided to introduce a selection of concepts in a simplified form that are further described below in the Detailed Description. This Summary is not intended to identify key features or essential features, nor is it intended to limit the scope of the claims included herewith.

Provided may be an attachment apparatus for laser engraving comprising: a chuck housing comprising a plurality of channels; a plurality of self-centering jaws bases disposed within the plurality of channels, the plurality of self-centering jaws bases further comprising at least one jaws base hole; and a scroll wheel in mechanical communication with the plurality of self-centering jaws bases.

The attachment apparatus may further comprise a plurality of adjustable stoppers disposed within the plurality of channels. In an embodiment, each of the plurality of self-centering jaws bases are disposed radially equidistant. In an embodiment, clockwise actuation of the scroll wheel is configured to radially move each of the plurality of self-centering jaws bases in a first direction and counterclockwise actuation of the scroll wheel is configured to radially move each of the plurality of self-centering jaws bases in a second direction.

The attachment apparatus for laser engraving may further comprise interchangeable jaws, the interchangeable jaws further comprising a jaws protuberance configured to be received by the at least one jaws hole.

In an embodiment, the interchangeable jaws are a plurality of rubber fingers. In another embodiment, the interchangeable jaws are a plurality of L jaws. In an embodiment, the apparatus further comprises a jaws extender, wherein the jaws extender is reversibly couplable to at least one of the plurality of self-centering jaws bases and the interchangeable jaws.

In an embodiment, the attachment apparatus for laser engraving may further comprise a jaws base stop, the jaws base stop further comprising a flange disposed upon the plurality of self-centering jaws bases, and a chuck housing protrusion, wherein the chuck housing protrusion is configured to impede movement of the plurality of self-centering jaws bases.

The attachment apparatus for laser engraving may further comprise a mounting bracket, wherein the mounting bracket secures the chuck housing to a horizontal mounting rail. In an embodiment, the apparatus includes a motor, wherein the motor is disposed within a motor housing, and wherein one or more mounting bracket secures the motor housing to a horizontal mounting rail.

The attachment apparatus for laser engraving may further comprise a tailpiece comprising a vertical rail; a vertical lift mounted to the vertical rail, the vertical lift comprising a knob; and a plurality of back rollers mounted to the vertical rail.

The attachment apparatus for laser engraving may further include a headboard mounted to a horizontal mounting rail, the headboard further comprising at least one rotary head wheel, wherein the rotary head wheel is in mechanical communication with a motor. The plurality of adjustable stoppers may further comprise an alignment screw, wherein the alignment screw is configured to position the plurality of adjustable stoppers in at least one of a locked position and an unlocked position. The scroll wheel may comprise a plurality of protrusions extending radially from a circumference of the scroll wheel. In an embodiment, each of the plurality of protrusions extend beyond a circumference of the chuck housing. In an embodiment, each of the plurality of self-centering jaws bases extend partially beyond an outer face of the chuck housing.

In an embodiment, the plurality of self-centering jaws bases comprises at least three self-centering jaws bases. In an embodiment, the mounting bracket is tiltable in at least a first axis. Each of the plurality of self-centering jaws bases may have an I-shaped cross section.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

Figure 1:
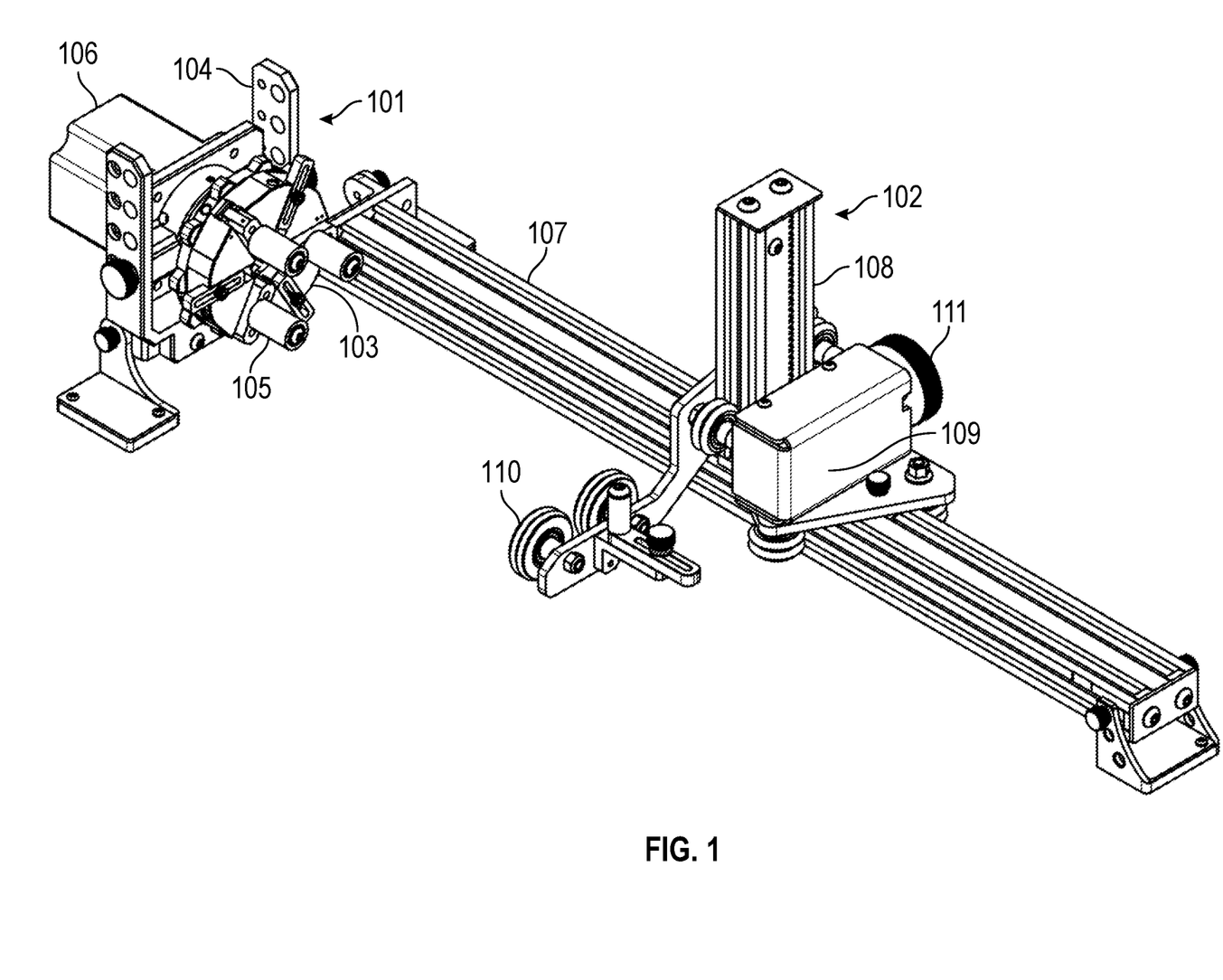
FIG. 1 illustrates an exemplary embodiment of the attachment apparatus integrated into an engraving system.

Described herein is an attachment apparatus configured for laser engraving (the "Attachment" or "chuck"). Referring to FIG. 1, in an embodiment, the Attachment may be utilized in conjunction with an engraving system comprised of a horizontal mounting rail 107, wherein said rail may serve as a backbone for supporting various aspects and components of the Attachment and the engraving system. The invention of the present disclosure contemplates features of both the Attachment (the chuck apparatus) and the engraving system.

In an embodiment, the engraving system may be further comprised of adjustable feet (not shown). The adjustable feet may be configured to support the Attachment and/or the engraving system. In an alternative embodiment, the adjustable feet may be disposed upon the horizontal mounting rail 107. In such an embodiment, the adjustable feet may be reversibly coupled to the horizontal mounting rail 107. In a further embodiment, the adjustable feet may employ at least one magnet, wherein said magnet is configured to reversibly couple to the horizontal mounting rail 107.

The engraving system may be further comprised of a tailpiece 102. In an embodiment, the tailpiece 102 may be disposed along the horizontal mounting rail 107. Such disposition of the tailpiece 102 may allow for said tailpiece 102 to slide along a length of the horizontal mounting rail 107. In an alternative embodiment, the tailpiece 102 may be in mechanical communication with a motor 106, wherein the motor 106 is electronically coupled to a computing device. As a nonlimiting example, the user may input the desired distance of the tailpiece 102 from a headboard 101 into the computing device, wherein said input is electronically translated to the motor 106, resulting in mechanical actuation of the tailpiece 102. However, the computing device and actuation of the motor thereof may be configured based on any dimensions or characteristics of the Apparatus, the engraving system, and the hosted article. Accordingly, the user may input the desired distance of the tailpiece 102 from a headboard 101 into the computing device or any other suitable distance, metric, or value adapted to facilitate proper actuation of the motor.

Moreover, the tailpiece 102 may be comprised of at least one back roller 110 and/or a vertical lift 109, wherein said roller 110 may be configured to support an article. The at least one back roller 110 may be configured to prevent the article from moving backwards during laser engraving. In a nonlimiting example, the support provided by the at least one back roller 110, may steady an article, thus preventing the article from moving backwards while it is being engraved by a laser. The tailpiece 102 may be further comprised of a vertical rail 108. In an embodiment, the vertical lift 109 may be disposed upon the vertical rail 108. Such disposition of the vertical lift 109 upon the vertical rail 108 may allow for said lift 109 to be raised and/or lowered along the vertical rail 108.

The tailpiece 102 may include a plurality of eccentric spacers (or other suitable spacers). In an embodiment, the plurality of eccentric spacers are disposed upon a bottom surface of the tailpiece 102. In another embodiment, the plurality of eccentric spacers may enable the tailpiece 102 to slide along the length of the horizontal mounting rail 107. The plurality of eccentric spacers may reversibly couple with the tailpiece 102, wherein said reverse coupling is achieved by a tailpiece bolt. In an embodiment, the tailpiece bolt may be threaded. In an alternative embodiment, the tailpiece bolt may include a notch, wherein said notch enables a user to determine how tightly the tailpiece bolt is screwed into the tailpiece 102 and/or the plurality of eccentric spacers.

The vertical lift 109 may employ a knob 111, wherein said knob 111 may adjust a lift height of said lift 109. In an embodiment, the knob 111 may be rotationally actuated by a user to adjust the lift height of the vertical lift 109. In an alternative embodiment, the knob 111 may be in mechanical communication with a secondary motor, wherein the secondary motor may be electronically coupled to the computing device. As a nonlimiting example, the user may input the desired lift height of the vertical lift 109 into the computing device, wherein said input is electronically translated to the secondary motor, resulting in mechanical actuation of the knob 111 and/or movement of the vertical lift 109.

In an embodiment, the vertical rail 108 may utilize a ruler (not pictured) disposed upon a surface of said rail 108, wherein said ruler may allow for the lift height of the vertical lift 109 to be ascertained. The ruler may be engraved and/or painted onto the vertical rail 108.

The Attachment and/or engraving system may be further comprised of a headboard 101. In an embodiment, the headboard 101 is disposed along the horizontal mounting rail 107. Further, the headboard 101 may be comprised of at least one of a mounting bracket 104 and/or a chuck housing 103.

In an embodiment, the chuck housing 103 may be comprised of interchangeable jaws 105, and a plurality of adjustable alignment stoppers 303.

Figure 2:
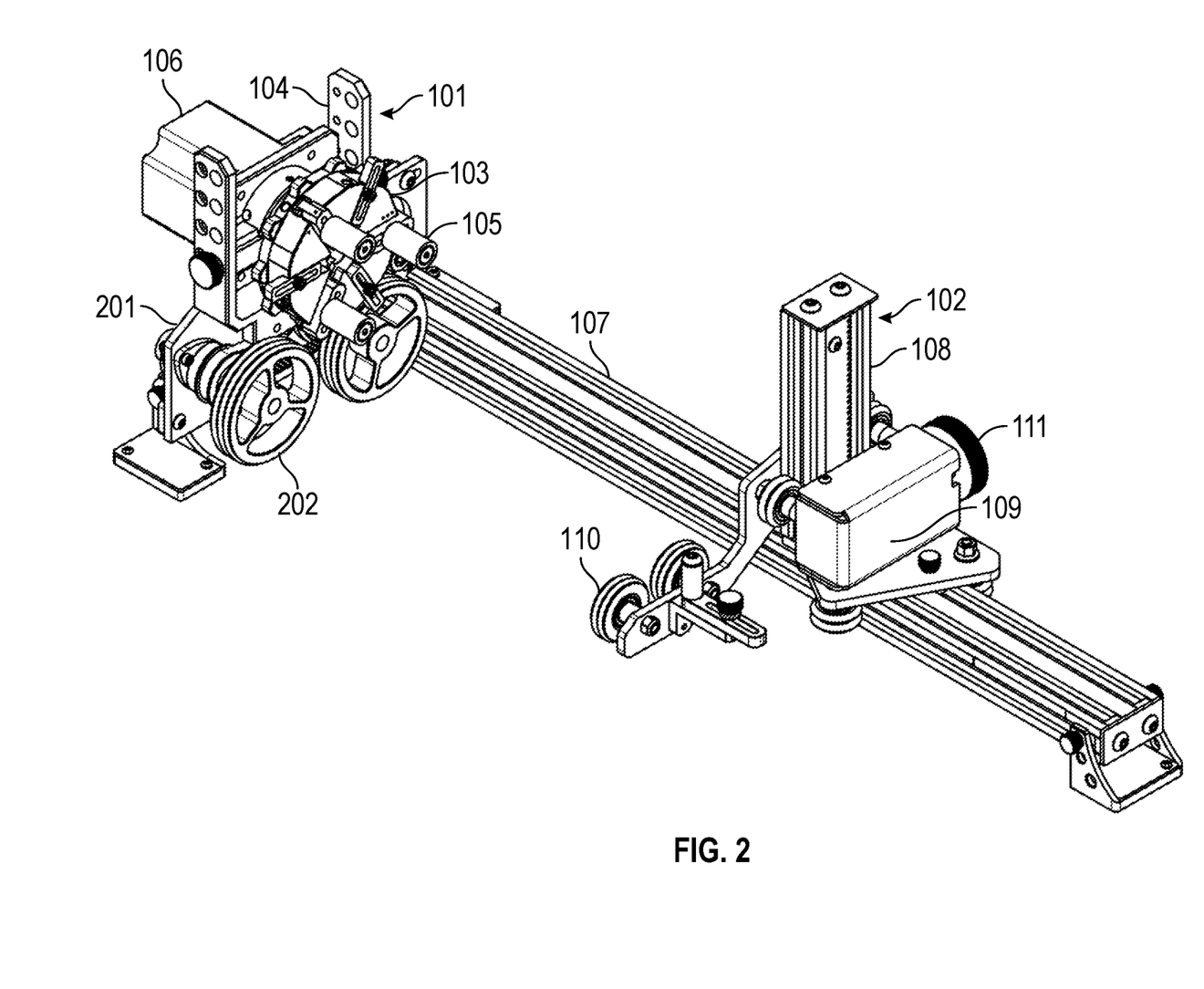
FIG. 2 illustrates an exemplary embodiment of the attachment apparatus integrated into an engraving system.

Turning to FIG. 2, in an embodiment, the headboard 101 may be further comprised of a rotary head mounting plate 201. The rotary head mounting plate 201 may be comprised of at least one rotary head wheel 202, wherein said wheel 202 may be configured to support the article. In a further embodiment, the at least one rotary head wheel 202 may be in mechanical communication with the motor 106, wherein the motor 106 is electronically coupled to the computing device. As a nonlimiting example, the user may input the desired spin rate and/or spin direction of the at least one rotary head wheel into the computing device, wherein said input is electronically translated to the motor 106, resulting in rotational actuation of said wheel. In such a nonlimiting example, a proximal portion of the article may be placed on the at least one rotary head wheel 202, and a distal portion of the article may be placed on the at least one back roller 110, wherein rotational actuation of the at least one rotary head wheel 202 rotates the article. In such a nonlimiting example, the article may be placed in contact with two rotary head wheels 202.

Figure 3:
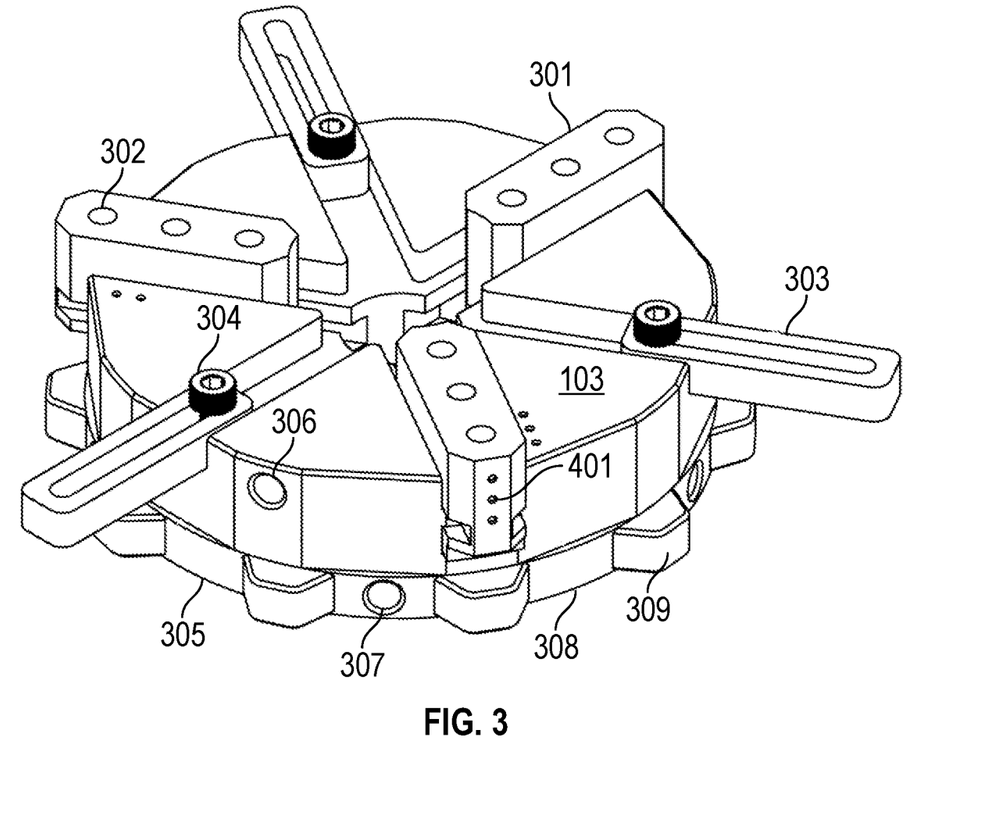
FIG. 3 illustrates an exemplary embodiment of the attachment apparatus.

Referring to FIG. 3, in an embodiment, the chuck housing 103 may be further comprised of at least one self-centering jaws base 301 and/or a scroll wheel 305. The at least one self-centering jaws base 301 may be disposed upon the chuck housing 103. In a nonlimiting example, a channel(s) may be formed within a face of the chuck housing 103, wherein said channel(s) is configured to house the at least one self-centering jaws base 301. In such a nonlimiting example, the at least one self-centering jaws base 301 may have at least one channel hole 401, wherein said channel hole 401 may correspond to the channel the at least one self-centering jaws base 301 is to be housed within. In an embodiment, the at least one self-centering jaws base 301 and the scroll wheel 305 are in mechanical communication, such that rotational actuation of the scroll wheel 305 may translate to linear motion of the at least one self-centering jaws base 301. As a nonlimiting example, the linear motion of the at least one self-centering jaws base 301 may move towards a center of the chuck housing 103 via clockwise rotational actuation of the scroll wheel 305. In a further nonlimiting example, the linear motion of the at least one self-centering jaws base 301 may move away from a center of the chuck housing 103 via counterclockwise rotational actuation of the scroll wheel 305. However, the at least one self-centering jaws base 301 may move away from or towards the center of the chuck housing 103 via either clockwise or counterclockwise actuation of the scroll wheel 305. In an embodiment, each of the at least one self-centering jaws base 301 are configured to move in tandem, such that actuation of scroll wheel 305 imparts equal movement in each of the at least one self-centering jaws base 301.

The scroll wheel 305 may be comprised of a plurality of grooves 308 and/or a plurality of protrusions 309. In an embodiment, the plurality of grooves 308 and/or the plurality of protrusions 309 may allow for a user's fingers to comfortably grip the scroll wheel 305. Such a grip may enable the user to rotationally actuate the scroll wheel 305, wherein said rotational actuation translates to linear motion of the at least one self-centering jaws base 301. In an embodiment, each of the protrusions 309 may extend beyond the circumference of the chuck housing 103 and/or each of the grooves may be positioned in line with or shallower than the circumference of the chuck housing 103. Thus, the protrusions 309 may extend outside the edge of the scroll wheel 305 and allows the operator's fingers to hold securely and rotate the scroll wheel 305. Such an arrangement promotes adequate manipulation by a user's digits from a number of angles, permitting the at least on self-centering jaws base 301 to include any suitable jutting components or angular jaws without preventing the user from operating the scroll wheel 305.

In another embodiment, the chuck housing 103 may be further comprised of a chuck housing lever hole 306 and/or a scroll wheel lever hole 307 (collectively the "holes"). The holes may be in mechanical communication with the at least one self-centering jaws base 301. In an embodiment, the holes may be configured to receive a tool. In such an embodiment, when the tool is received by at least one of the chuck housing lever hole 306 and the scroll wheel lever hole 307, rotational actuation of the tool may result in linear motion of the at least one self-centering jaws base 301. The holes may provide the user with a second way to adjust the at least one self-centering jaws base 301.

The at least one self-centering jaws base 301 may be configured to accept the interchangeable jaws 105. In an embodiment, the interchangeable jaws 105 reversibly couple with the at least one self-centering jaws base 301. In such an embodiment, rotational actuation of the scroll wheel 305 enables a user to adjust the interchangeable jaws 105, via the linear motion of the at least one self-centering jaws base 301. In one embodiment, clockwise rotation of the scroll wheel 305 may cause the one or jaws bases 301 to move in a first direction (e.g., away from the center of the chuck housing 103) and counterclockwise rotation of the scroll wheel 305 may cause the one or more jaws bases 301 to move in a second direction (e.g., toward the center of the chuck housing 103). However, the apparatus may be configured such that the scroll wheel 305 may be rotated in either direction to impart any desired movement in the one or more self-centering jaws bases 301. The adjustment of the interchangeable jaws 105 may allow for users to accommodate articles of various sizes, which may prevent the user from having to change the type of jaws utilized while laser engraving. Further, the adjustment of the interchangeable jaws 105 may obviate a need for further tooling, which may encourage increased storage space for the user. The at least one self-centering jaws base 301 may be comprised of at least one jaws hole 302. In an embodiment, the at least one jaws hole 302 is threaded. In such an embodiment, the interchangeable jaws 105 may reversibly couple with the at least one jaws hole 302 via a threaded connection. However, the at least one jaws hole 302 and the interchangeable jaws 105 may interface via any suitable means. In an alternative embodiment, the at least one jaws hole 302 may consist of three holes. In such an embodiment, the three holes may provide a user with the ability to customize a configuration of the interchangeable jaws 105 with the at least one self-centering jaws base 301.

The plurality of adjustable alignment stoppers 303 may be disposed upon the chuck housing 103. In a nonlimiting example, the plurality of adjustable alignment stoppers 303 may be disposed within a channel of the chuck housing 103, wherein said channel is sized to accept one or more of the plurality of adjustable alignment stoppers 303. In an embodiment, the plurality of adjustable alignment stoppers 303 may be further comprised of an alignment screw 304. In another embodiment, the alignment screw 304 may be threaded. The plurality of adjustable stoppers 303 may be comprised of a stopper channel. In a further embodiment, the alignment screw 304 may be disposed within the stopper channel. In such an embodiment, tightening the alignment screw 304 may lock the plurality of adjustable alignment stoppers 303 in a fixed position, and/or loosening the alignment screw 304 may unlock the plurality of adjustable alignment stoppers 303 allowing said stoppers 303 to move linearly.

The alignment screw 304 may be configured to keep the plurality of adjustable stoppers 303 in at least one of a locked position and an unlocked position. Said linear movement of the plurality of adjustable alignment stoppers 303 may enable the user to increase a contact surface area between the article and the headboard 101. In one embodiment, each of the plurality of stoppers 303 may move independently of one another. Thus, for example, each of the plurality of adjustable stoppers 303 may have independent movement, wherein each of the interchangeable jaws 105 may have tandem movement. The increased contact surface area between the article and the headboard 101 may ensure a central axis of the article is aligned with a central axis of the headboard 101, wherein the alignment may provide a more even and/or stable surface for laser engraving of the article. As a nonlimiting example, the plurality of adjustable alignment stoppers 303, may be unlocked, allowing a user to adjust said stoppers 303 to at least one of an extended position and a non-extended position. In such a nonlimiting example, an article, secured by the interchangeable jaws, may have a circumference greater than that of the face of the chuck housing 103, the plurality of adjustable alignment stoppers 303 may be configured into an extended position, allowing for said stoppers 303 to come into contact with the article. Such interchangeability of positions of the plurality of adjustable alignment stoppers 303 may allow for a user to secure articles larger than the face of the chuck housing 103.

In an embodiment, the apparatus comprises at least three self-centering jaws bases 301. However, the apparatus may include any suitable number of self-centering jaws bases 301. For example, the apparatus may include three, four, or five self-centering jaws bases 301. In various embodiments, the apparatus may include a number and/or configuration of channels or stoppers 303 or any chuck housing configuration enabling utilization of the desired number of self-centering jaws bases 301. For example, in an embodiment with four self-centering jaws bases 301, the plurality of channels may be structured to house the four self-centering jaws bases 301, for example, such that each of the plurality of self-centering jaws bases 301 are disposed radially equidistant from one another. In various embodiments, regardless of the number of self-centering jaws bases 301, each of the self-centering jaws bases 301 may embody any of the configurations described herein. Further, each of the self-centering jaws bases 301 may accept any configuration of interchangeable jaws 105.

Figure 4:
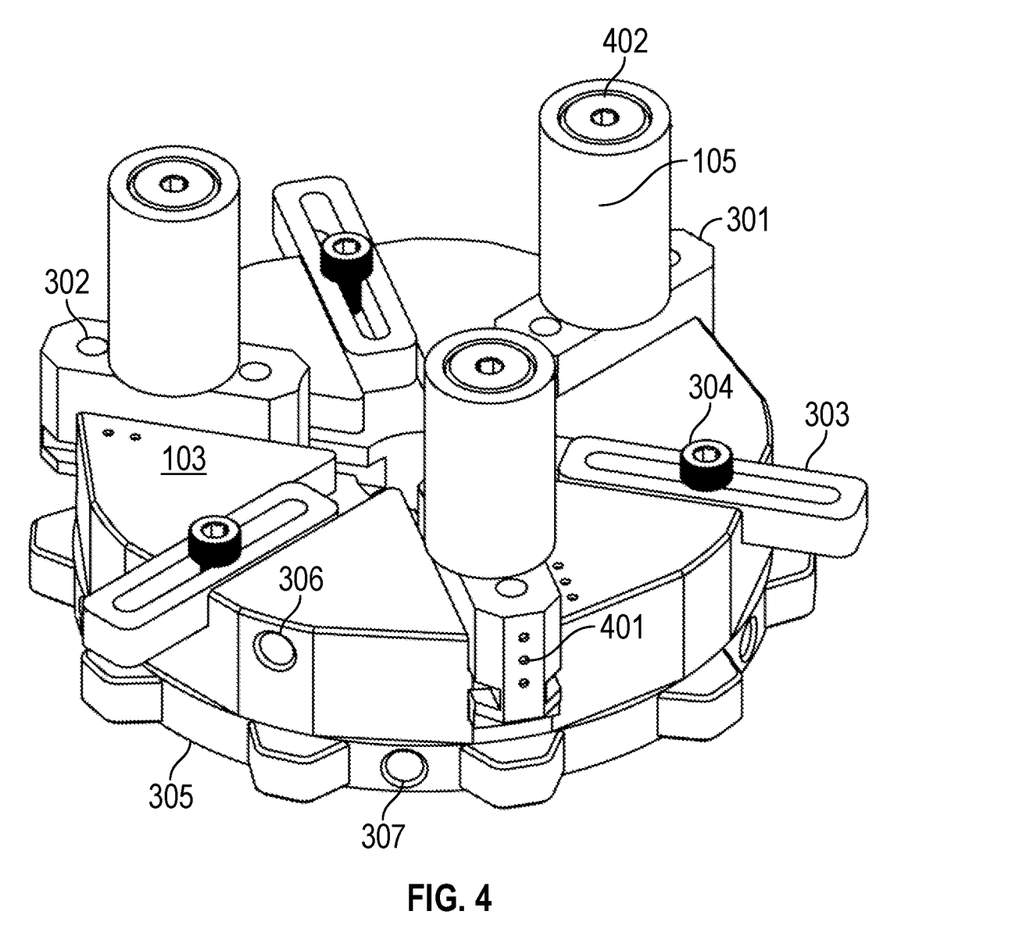
FIG. 4 illustrates an exemplary embodiment of the attachment apparatus.

Turning to FIG. 4, in an embodiment, the interchangeable jaws 105 may be comprised of a plurality of rubber fingers. The plurality of rubber fingers may be comprised of a core and/or a jaws protuberance 402. In an alternative embodiment, the jaws protuberance 402 may be disposed upon at least one of a rubber finger distal end and a rubber finger proximal end. Further, the plurality of rubber fingers may be further comprised of non-rigid rubber-like material, wherein said material covers the core. In an embodiment, the jaws protuberance 402 may be threaded. In another embodiment, the jaws protuberance 402 may be configured to be received by the at least one jaws hole 302. In such an embodiment, the jaws protuberance 402 may threadably and reversibly couple to the at least one jaws hole 302. As a nonlimiting example, the at least one jaws hole 302 may be comprised of three holes, wherein the jaws protuberance 402 may be received by any one of the three holes. In such a nonlimiting example, the ability of the jaws protuberance 402 to be received by any one of the three holes, comprising the at least one jaws hole 302, may increase a user level of customizability by allowing said user to alternate between configurations of the rubber fingers with the at least one self-centering jaws base 301. Such customizability may allow for a user to adapt the configurations of the rubber fingers with the at least one self-centering jaws base 301 in order to accommodate articles of varying sizes. As a further nonlimiting example, placing the jaws protuberance 402 in a first hole of the three holes, comprising the at least one jaws hole 302, may allow for the interchangeable jaws 105 to secure small articles such as, pens and/or pencils. In yet a further nonlimiting example, placing the jaws protuberance 402 in a third hole of the three holes, comprising the at least one jaws hole 302, may allow for the interchangeable jaws 105 to secure large articles such as, tumblers.

In an embodiment, the rubber fingers may be in the shape of a cylinder. Said cylindrical shape may allow for the rubber fingers to secure an article from at least one of an outside surface and an inside surface of the article. Further, the non-rigid rubber-like material, which may comprise an outside surface of the rubber fingers, may enable the interchangeable jaws 105 to secure fragile and/or delicate articles, such as glassware. In another embodiment, the non-rigid rubber-like material may increase the force of friction between the rubber fingers and the article, thus allowing for the rubber fingers to more securely hold the article during laser engraving. In an alternative embodiment, a rubber finger length may be defined by the distance between the rubber finger distal end and the rubber finger proximal end. In a further embodiment, the plurality of rubber fingers may vary in the rubber finger length. As a nonlimiting example, the plurality of rubber fingers may have a shorter rubber finger length to accommodate smaller articles. In such a nonlimiting example, the shorter rubber finger length may enable a user to secure a tapered article within the interchangeable jaws 105. Further, the shorter rubber finger length may enable a user to secure articles that are comprised of a ridge disposed upon an inside surface of said article within the interchangeable jaws 105. In a further nonlimiting example, the plurality of rubber fingers may have a longer length to accommodate larger articles. Said rubber fingers may be installed and removed by hand without the use of any tools. In alternate embodiments, the rubber fingers may include a set screw or other fastening mechanism, wherein a tool may be utilized for installation and removal of said rubber fingers. In various embodiments, the interchangeable jaws 105 may comprise fingers of various lengths. For example, the interchangeable jaws 105 may be configured with a long finger or a short finger. As a nonlimiting example, the short fingers may be useful for use with tumblers and the like via the inner rims of said tumblers and the like.

Figure 5:
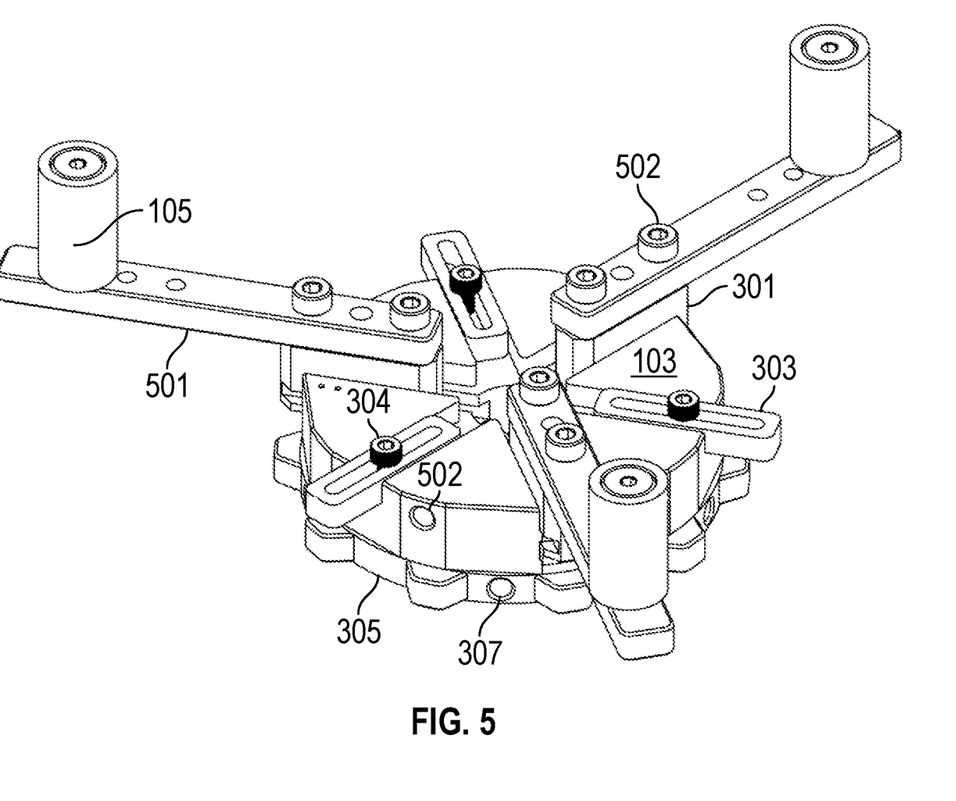
FIG. 5 illustrates an exemplary embodiment of the attachment apparatus.

Referring to FIG. 5, in an embodiment, the interchangeable jaws 105 may interface with a jaws extender 501. In an embodiment, a proximal portion of the jaws extender 501 may be reversibly coupled to the at least one self-centering jaws base 301. In such an embodiment, at least one jaws screw 502 may facilitate the reversible coupling of the jaws extender 501 with the at least one self-centering jaws base 301. In an alternative embodiment, the at least one jaws screw 502 is threaded. In a further embodiment, the distal portion of the jaws extender 501 may reversibly couple with the plurality of rubber fingers, wherein said reverse coupling may be facilitated by the jaws protuberance. The jaws extender 501 may have a jaws extender length defined by the distance between the distal portion of the jaws extender 501 and the proximal portion of the jaws extender 501. The jaws extender length may exceed the rubber finger length. In yet a further embodiment, the jaws extender 501 may employ the jaws extender length to enable the interchangeable jaws 105 to secure articles of a larger size such as, a bowl.

The jaws extender 501 may fasten to the at least one self-centering jaws base 301 via one or more of the at least one jaws hole 302. Accordingly, the protruding position of the jaws extender 501 may be extended by positioning the jaws extender 501 such that the most inner holes of the jaws extender 501 interface with the most outer at least one jaws hole 302. However, the relativistic position between the jaws extender 501, the at least one self-centering jaws base 301, and/or the at least one jaws hole 302 may be adjusted to further extend (or reduce) the reach of the at least one self-centering jaws base 301. Thus, the overall reach of the at least one self-centering jaws base 301 may be a function of the position of the at least one self-centering jaws base 301 (for example, as adjusted via the scroll wheel 305); the position of the jaws extender 501 relative to the at least one self-centering jaws base 301; and/or the position of the interchangeable jaws 105 relative to the jaws extender 501.

In an embodiment, the space between the distal tip of a jaw extender 501 and an interchangeable jaw 105 may be sufficient to allow indexing of the hosted article. For example, in an instance where the hosted article has a circumference extending beyond the interchangeable jaw 105, the rim of the hosted article may rest upon the space between the distal tip of the jaw extender 501 and the interchangeable jaw 105. Moreover, in an instance where the hosted article has a circumference within the interchangeable jaw 105, the rim of the hosted article may rest upon any portion of the jaw extender 501 within the limits of the interchangeable jaw 105.

Figure 6:
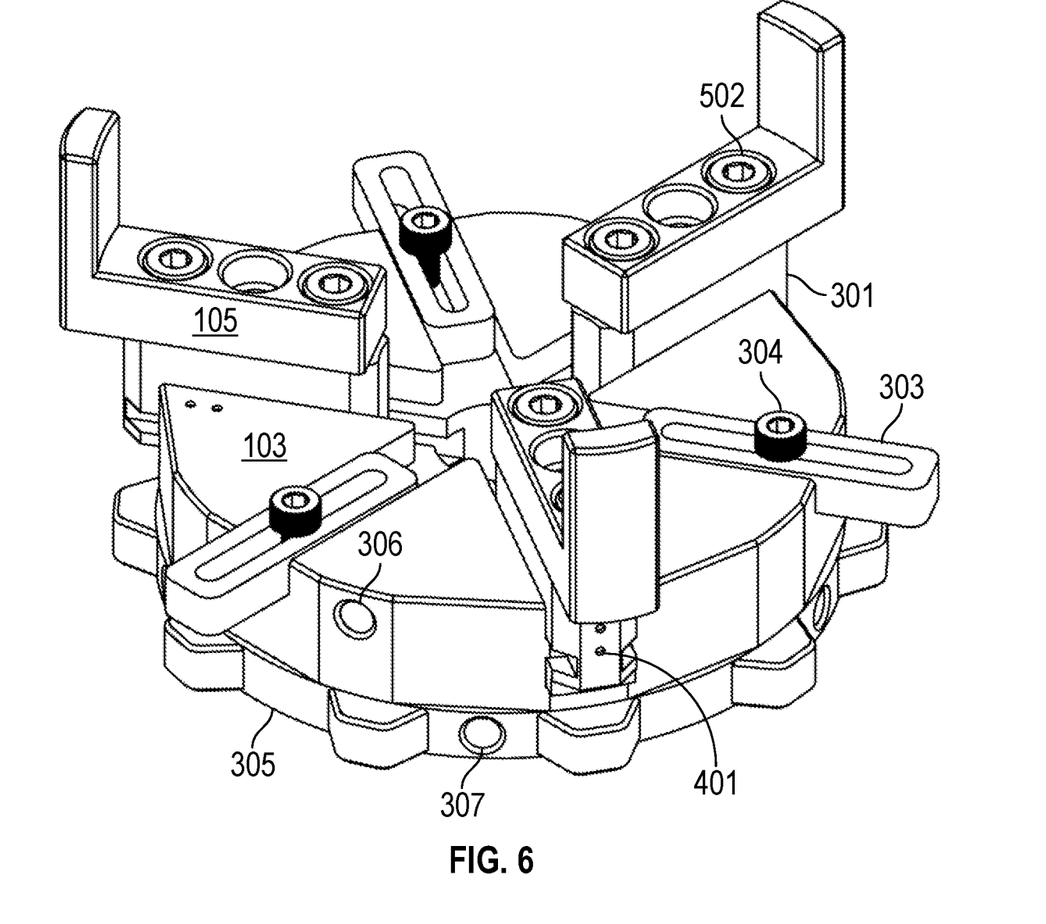
FIG. 6 illustrates an exemplary embodiment of the attachment apparatus.

Referring to FIG. 6, in an embodiment, the interchangeable jaws 105 may include at least one L jaw. The at least one L jaw may be comprised of a rigid material. In another embodiment, the at least one L jaw may reversibly couple with the at least one self-centering jaws base 301. In such an embodiment, the at least one jaws screw 502 may be employed to facilitate the reversible coupling of the at least one L jaw to the at least one self-centering jaws base 301. In an alternative embodiment, the at least one L jaw may reversibly couple with the distal portion of the jaws extender 501.

In an embodiment, the at least one L jaw may be comprised of at least an L jaw base and an L jaw grip. The L jaw base may reversibly couple with the at least one self-centering jaws base 301. In an embodiment, the L jaw base may contain a plurality of holes, wherein said holes are able to be traversed by the at least one jaws screw 502. In a further embodiment, the L jaw grip may be orthogonal to the L jaw base, such that the L jaw grip is able to secure an article. As a nonlimiting example, the L jaw may be configured to grip articles with a large circumference (i.e., bowls).

Figure 7:
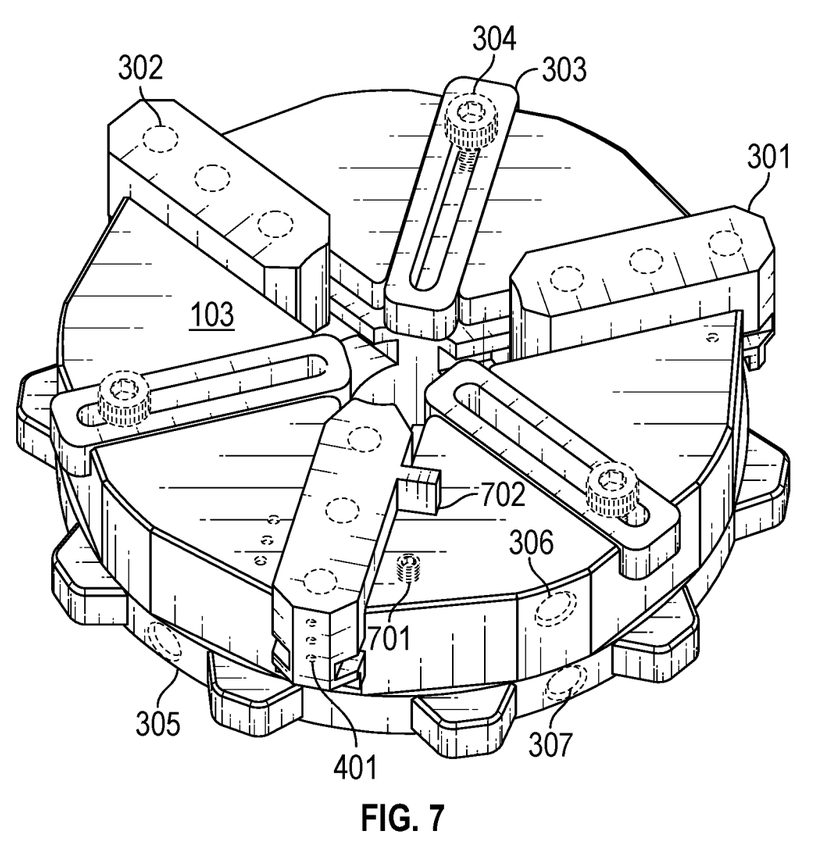
FIG. 7 illustrates an exemplary embodiment of the attachment apparatus.

Turning to FIG. 7, the self-centering jaws base 301 may include a jaws base stop. In an embodiment, the jaws base stop may be comprised of a chuck housing protrusion 701. In a further embodiment, the chuck housing protrusion 701 may be disposed on the face of the chuck housing 103. The jaws base stop may be further comprised of a flange 702. In yet a further embodiment, the flange 702 may be disposed upon an outside surface of the at least one self-centering jaws base 301. In an embodiment, the chuck housing protrusion 701 may impede the linear motion of the at least one self-centering jaws base 301. In such an embodiment, the linear motion of the at least one self-centering jaws base 301 may be impeded when the flange 702, disposed upon an outside surface of said jaws base 301, comes into contact with the chuck housing protrusion 701. The jaws base stop may prevent the at least one self-centering jaws base 301 from moving past a specificized point away from the center of the chuck housing 103. Accordingly, the interfacing of the chuck housing protrusion 701 and the flange 702 may prevent the at least one self-centering jaws base 301 from inadvertently falling out of the channel. Alternatively, the jaws base stop may prevent the at least one self-centering jaws base 301 from moving past a specificized point towards the center of the chuck housing 103. As a nonlimiting example, only one of the self-centering jaws bases 301 may include a flange 702, wherein the meeting of the singular flange 702 with the chuck housing protrusion 701 may impede the motion of all of the self-centering jaws bases 301. In alternative embodiments, the apparatus may include a plurality of flanges 702 and/or chuck housing protrusions 701.

Figure 8:
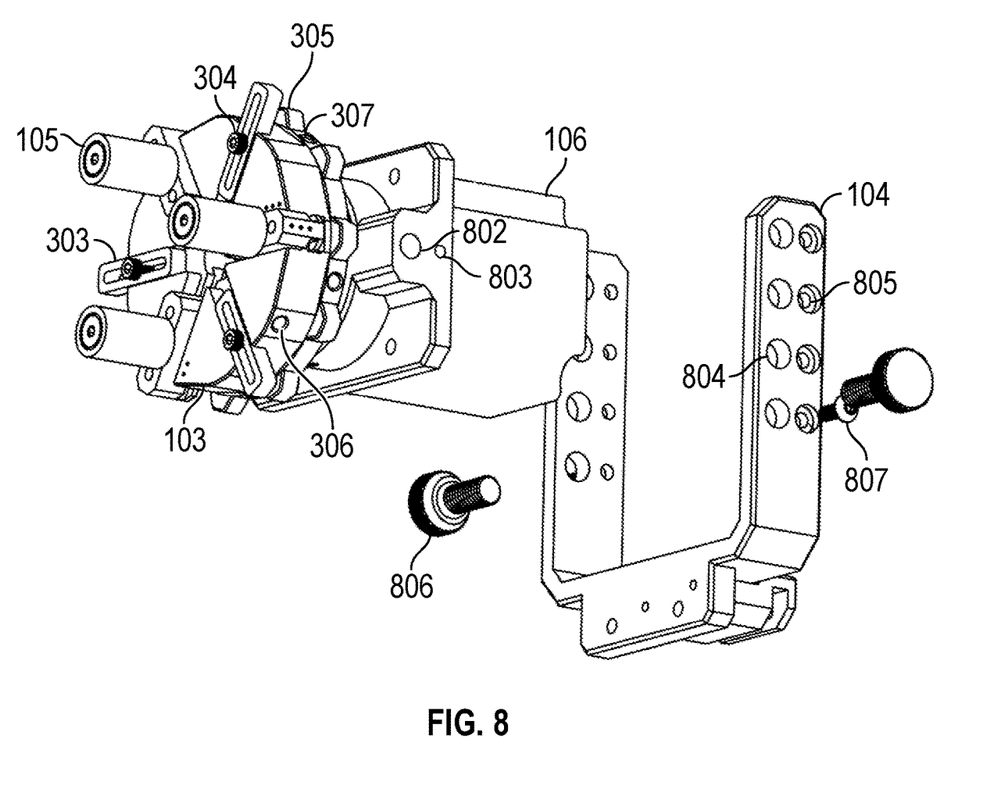
FIG. 8 illustrates an exemplary embodiment of the attachment apparatus mounted to a mounting system.

Turning to FIG. 8, the Attachment may further comprise the mounting bracket 104 and/or a motor housing 801. In an embodiment, the mounting bracket 104 may be configured to attach to the horizontal mounting rail 107. In a further embodiment, the mounting bracket 104 may be configured to secure and support at least one of the chuck housing 103 and the motor housing 801. Further, the motor housing 801 may be configured to house the motor 106. Additionally, the chuck housing 103 may be attached to the motor housing 801. In an embodiment, the motor 106 and the chuck housing 103 are in mechanical communication. In such an embodiment, activation of the motor 106 may translate to rotational movement of the chuck housing 103. In a further embodiment, the motor housing 801 may be comprised of at least one motor housing hole. As a nonlimiting example, the motor housing 801 has at least a housing tilt screw hole 802 and a housing horizontal lock screw hole 803. In an alternative embodiment, the mounting bracket 104 may be comprised of a plurality of mounting holes, wherein the plurality of holes may include at least one mount tilt screw hole 804 and at least one mount horizontal lock screw hole 805.

In an embodiment, the motor housing 801 may be secured to the mounting bracket 104 by at least one mounting screw. In a further embodiment, the at least one mounting screw may be threaded. In such an embodiment, the at least one mounting screw may be comprised of at least one tilt screw 806 and at least one horizontal lock screw 807. As a nonlimiting example, the housing tilt screw hole 802 and the housing horizontal lock screw hole 803 may align with the at least one mount tilt screw hole 804 and the at least one mount horizontal lock screw hole 805, respectively, wherein the at least one tilt screw 806 traverses both the housing tilt screw hole 802 and the at least one mount tilt screw hole 804, and the at least one horizontal lock screw 807 traverses both the housing horizontal lock screw hole 803 and the mount horizontal lock screw hole 805. The at least one tilt screw 806 may allow a user to adjust an angle of the motor housing 801, wherein the angle of the motor housing may facilitate multiple engraving angles for the laser engraver.

The mounting bracket 104 may further comprise a first arm and/or a second arm. In an embodiment, the plurality of mounting holes may be vertically disposed along the first arm and/or the second arm. As a nonlimiting example, the first arm may have four mount tilt screw holes 203 and four mount horizontal lock screw holes 204. In such a nonlimiting example, the vertical disposition of the four mount tilt screw holes 203 and the four mount horizontal lock screw holes 204 may allow for the user to adjust the mounting height of the motor housing 801. The ability to adjust the mounting height of the motor housing 801 may allow for the user to adjust the distance of the article's surface to the laser engraver.

In an embodiment, the apparatus described herein may comprise a self-centering jaw that allows tool-less adjustment of jaw positions with the help of a scroll wheel, and a protrusion that extends outside the edge of the scroll wheel and allows the operator's fingers to hold securely and rotate the scroll wheel. Further, in an embodiment, a set of adjustable alignment stoppers may be mounted into the grooves on top of a chuck housing to allow the engraving object edge to be aligned parallel to the chuck housing face plane. In yet a further embodiment, a set of self-aligning base jaws serve as the main/base platform for an interchangeable jaw, and the base jaw may include three threaded holes to attach various types of jaws in different positions. As a nonlimiting example, the rotary chuck provides secure and gentle support for cylindrical objects to be engraved and allows quick and precise position adjustment to accommodate various shapes and sizes of the engraving objects.

Figure 9:
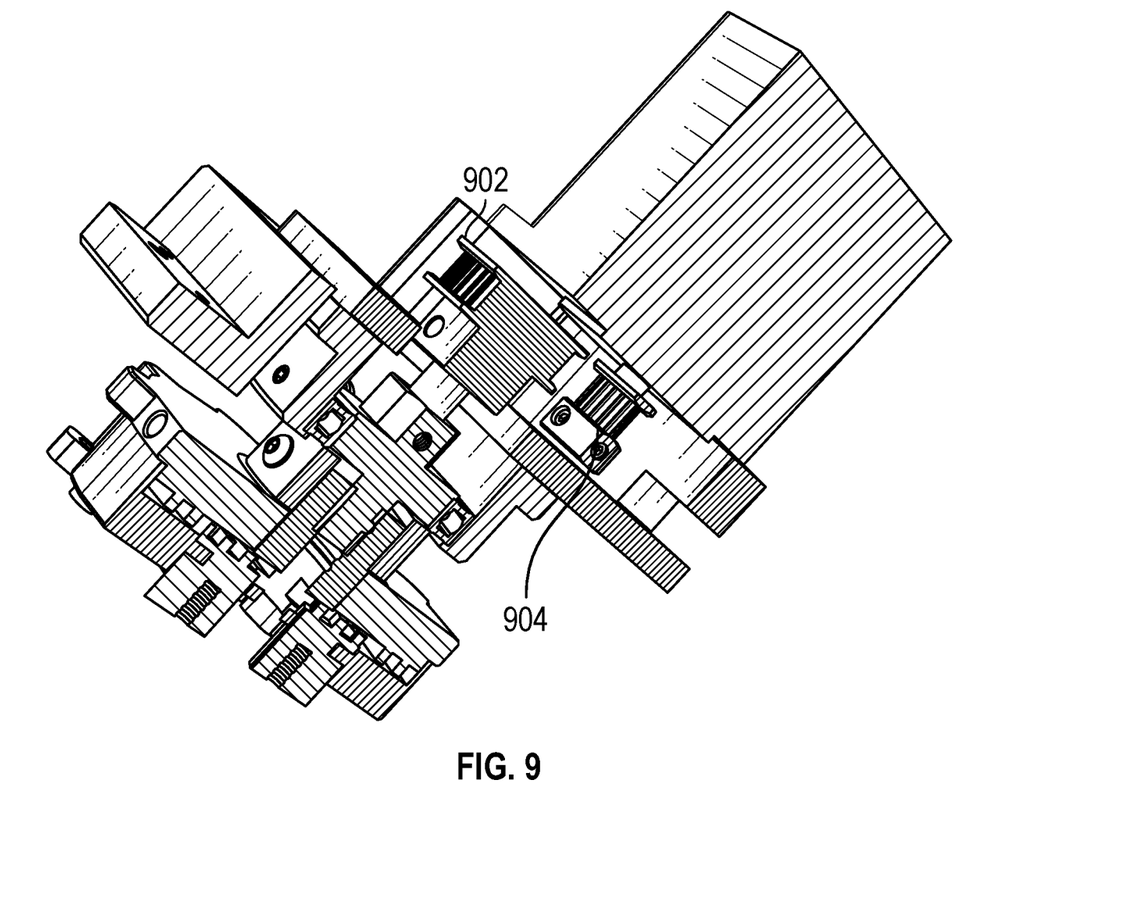
FIGS. 9-10 illustrate an exemplary embodiment of the attachment apparatus integrated into an engraving system.
Figure 10:
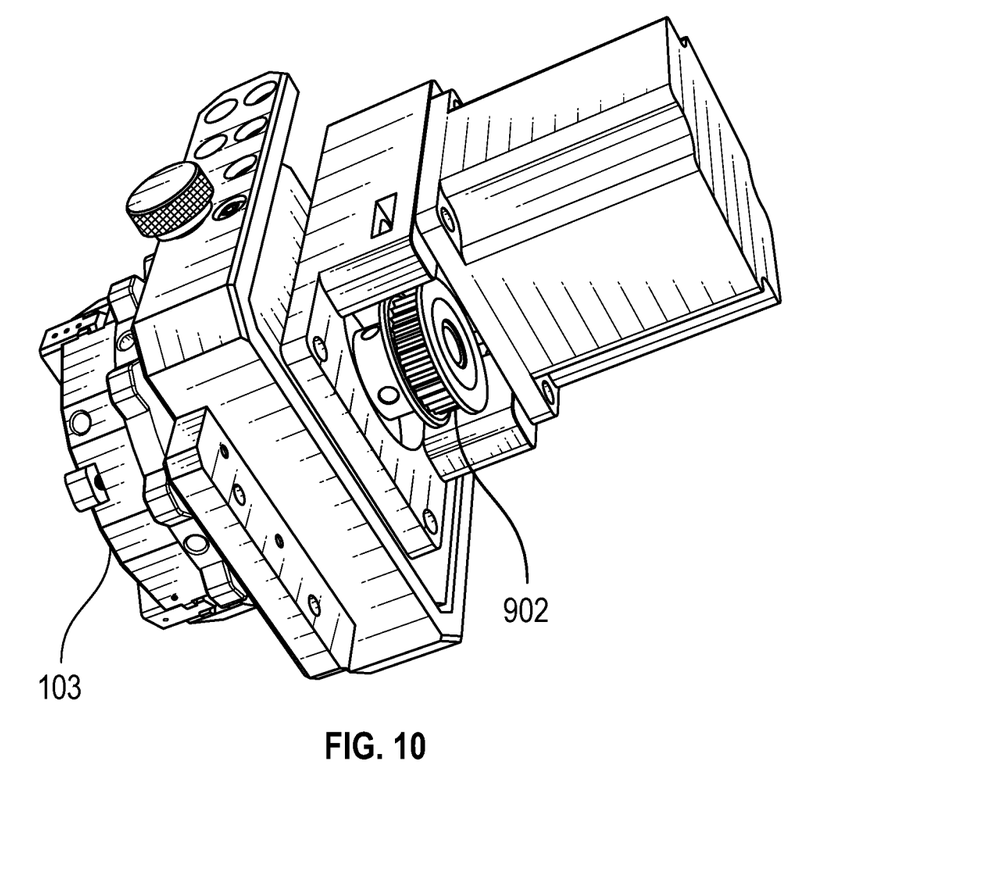

Referring to FIGS. 9-10, in an embodiment, instead of a main shaft being coupled directly to the motor, the apparatus may include a set of pulleys and a belt (e.g., manifesting a $2x$ to $4x$ gear reduction system). In such an embodiment, a pulley (e.g., a small 16T pulley) is attached to the motor shaft and a belt is used to transfer motion to another pulley (e.g., a pulley having a greater number of teeth) that may be attached to the grip's shaft. Referring to FIG. 9, the main shaft may be coupled directly to the motor, wherein a first pulley 902 is attached to a second pulley 904 via a belt. Accordingly, such a setup may increase torque and increase rotation resolution such that the apparatus enables better engraving (e.g., smaller intervals).

As described above, the mounting bracket 104 may be configured to accept the chuck housing 103. In one embodiment, the chuck housing 103 may attach to headboard 101, directly to the mounting bracket 104, or directly to the rail 107. The headboard 101 may be configured to hold the feet, as well, providing support for the overall apparatus. Mount thumbscrews may be attached to the mounting bracket 104 and/or the chuck housing 103 to allow for control of the angle/tilt of the mounting bracket 104 and/or the chuck housing 103.

Aspects of the present disclosure relate to an attachment apparatus for laser engraving including: a chuck housing having a plurality channels; a plurality of adjustable stoppers disposed within the plurality of channels; a plurality of self-centering jaws bases disposed within the plurality of channels, the plurality of self-centering jaws bases further including, at least one jaws base hole; and a scroll wheel in mechanical communication with the plurality of self-centering jaws bases.

Aspects of the present disclosure relate to an attachment apparatus for laser engraving further including: interchangeable jaws, the interchangeable jaws further including, a jaws protuberance, the jaws protuberance configured to be received by the at least one jaws hole.

Aspects of the present disclosure relate to an attachment apparatus for laser engraving, wherein the interchangeable jaws are a plurality of rubber fingers.

Aspects of the present disclosure relate to an attachment apparatus for laser engraving, wherein the interchangeable jaws are a plurality of L jaws.

Aspects of the present disclosure relate to an attachment apparatus for laser engraving, further including: a jaws extender, wherein the jaws extender is reversibly couplable to at least one of the plurality of self-centering jaws bases and the interchangeable jaws.

Aspects of the present disclosure relate to an attachment apparatus for laser engraving, further including: a jaws base stop, the jaws base stop further including, a flange disposed upon the plurality of self-centering jaws bases, and a chuck housing protrusion, wherein the chuck housing protrusion is configured to impede movement of the plurality of self-centering jaws bases.

Aspects of the present disclosure relate to an attachment apparatus for laser engraving, further including: a mounting bracket, wherein the mounting bracket secures the chuck housing to a horizontal mounting rail.

Aspects of the present disclosure relate to an attachment apparatus for laser engraving, further including: a motor, wherein the motor is disposed within a motor housing, and wherein one or more mounting bracket secure the motor housing to a horizontal mounting rail.

Aspects of the present disclosure relate to an attachment apparatus for laser engraving, further including: a tailpiece including, a vertical rail, a vertical lift mounted to the vertical rail, the vertical lift further including, a knob, and a plurality of back rollers mounted to the vertical rail.

Aspects of the present disclosure relate to an attachment apparatus for laser engraving, further including: a headboard mounted to a horizontal mounting rail, the headboard further included of, at least one rotary head wheel, wherein the rotary head wheel is in mechanical communication with a motor.

Aspects of the present disclosure relate to an attachment apparatus for laser engraving, wherein the plurality of adjustable stoppers further include an alignment screw, wherein the alignment screw is configured to put the plurality of adjustable stoppers in at least one of a locked position and an unlocked position.

Aspects of the present disclosure related to an attachment apparatus for laser engraving, wherein the scroll wheel comprises a plurality of protrusions extending radially from a circumference of the scroll wheel.

Aspects of the present disclosure relate to an attachment apparatus for laser engraving, wherein each of the plurality of protrusions extend beyond a circumference of the chuck housing.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

Various elements, which are described herein in the context of one or more embodiments, may be provided separately or in any suitable subcombination. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

All references, patents and patent applications and publications that are cited or referred to in this application are incorporated in their entirety herein by reference. Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. An attachment apparatus for laser engraving comprising:
    a chuck housing defining a plurality of channels;
    a plurality of self-centering jaws bases disposed within the plurality of channels,
        wherein the plurality of self-centering jaws bases comprise at least one jaws base hole,
        wherein each of the plurality of channels is accessible through a circumferential perimeter of the chuck housing enabling at least a portion of the self-centering jaws bases to extend past the circumferential perimeter,
        wherein each of the plurality of self-centering jaws bases includes one or more circular indicators,
        wherein each of the channels includes one or more ridges disposed along a length of each channel, and
        wherein each of the plurality of self-centering jaws bases has an I-shaped cross section configured to interface with the one or more ridges;
    a scroll wheel in mechanical communication with the plurality of self-centering jaws bases,
        wherein the scroll wheel comprises a plurality of protrusions extending radially from a circumference of the scroll wheel beyond the circumference of the chuck housing; and
    a plurality of interchangeable jaws, each of the interchangeable jaws further comprising a jaws protuberance configured to be received by the at least one jaws base hole and extending off a face of at least one of the self-centering jaws bases.

2. The attachment apparatus for laser engraving of claim 1 further comprising a plurality of adjustable stoppers disposed within the plurality of channels, wherein each of the plurality of adjustable stoppers is configurable between an extended and non-extended position, wherein, in the extended position, the plurality of adjustable stoppers extend past the circumference of the chuck facing to contact an article having a diameter larger than the circumference of the chuck facing.

3. The attachment apparatus for laser engraving of claim 2, wherein each of the plurality of adjustable stoppers further comprises an alignment screw,
    wherein the alignment screw is configured to position each of the plurality of adjustable stoppers in at least one of a locked position and an unlocked position.

4. The attachment apparatus for laser engraving of claim 1, wherein each of the plurality of self-centering jaws bases are disposed radially equidistant.

5. The attachment apparatus for laser engraving of claim 1, wherein clockwise actuation of the scroll wheel is configured to radially move each of the plurality of self-centering jaws bases in a first direction and counterclockwise actuation of the scroll wheel is configured to radially move each of the plurality of self-centering jaws bases in a second direction.

6. The attachment apparatus for laser engraving of claim 1, wherein the interchangeable jaws are a plurality of rubber fingers.

7. The attachment apparatus for laser engraving of claim 1, wherein the interchangeable jaws are a plurality of L jaws.

8. The attachment apparatus for laser engraving of claim 1, further comprising a jaws extender, wherein the jaws extender is reversibly couplable to at least one of the plurality of self-centering jaws bases and the interchangeable jaws.

9. The attachment apparatus for laser engraving of claim 1, further comprising a jaws base stop, the jaws base stop further comprising:
    a flange disposed upon the plurality of self-centering jaws bases, and
    a chuck housing protrusion, wherein the chuck housing protrusion is configured to impede movement of the plurality of self-centering jaws bases.

10. The attachment apparatus for laser engraving of claim 1, further comprising a mounting bracket, wherein the mounting bracket secures the chuck housing to a horizontal mounting rail.

11. The attachment apparatus for laser engraving of claim 10, wherein the mounting bracket is tiltable in at least a first axis.

12. The attachment apparatus for laser engraving of claim 1, further comprising a motor,
    wherein the motor is disposed within a motor housing, and
    wherein one or more mounting bracket secures the motor housing to a horizontal mounting rail.

13. The attachment apparatus for laser engraving of claim 1, further comprising a tailpiece comprising:

a vertical rail;

a vertical lift mounted to the vertical rail, the vertical lift comprising a knob; and a plurality of back rollers mounted to the vertical rail.

14. The attachment apparatus for laser engraving of claim 1, further comprising a headboard mounted to a horizontal mounting rail, the headboard further comprising:

at least one rotary head wheel, wherein the rotary head wheel is in mechanical communication with a motor.

15. The attachment apparatus for laser engraving of claim 1, wherein, when each of the plurality of self-centering jaws bases are in a home position, each of the plurality of self-centering jaws bases extend partially beyond an outer face of the chuck housing.

16. The attachment apparatus for laser engraving of claim 1, wherein the plurality of self-centering jaws bases comprises at least three self-centering jaws bases.

17. The attachment apparatus for laser engraving of claim 1, wherein each of the plurality of self-centering jaws bases has an I-shaped cross section.

18. The attachment apparatus for laser engraving of claim 1, wherein the plurality of protrusions extending beyond the circumference of the scroll wheel define a plurality of grooves configured to interface with an operator's fingers to securely hold and rotate the scroll wheel.

19. The attachment apparatus for laser engraving of claim 1, wherein a top surface of each of the plurality of self-centering jaws bases extends above a top surface of the chuck housing, and wherein a top surface of each jaws protuberance is approximately level with a top surface of each of the interchangeable jaws.

* * * * *